United States Patent [19]

Zankl

[11] 4,404,727
[45] Sep. 20, 1983

[54] MACHINE TOOL OPERABLE AS BOTH A CHUCKING TYPE LATHE AND AS A MACHINING CENTER

[75] Inventor: Frank Zankl, Brookfield, Wis.

[73] Assignee: Kearney & Trecker Corporation, West Allis, Wis.

[21] Appl. No.: 237,750

[22] Filed: Feb. 24, 1981

[51] Int. Cl.³ .............................................. B23Q 3/157
[52] U.S. Cl. ........................................ 29/568; 82/2.5
[58] Field of Search .................... 29/568, 26 P; 82/2.5

[56] References Cited

U.S. PATENT DOCUMENTS

| | | | |
|---|---|---|---|
| 3,550,487 | 12/1970 | Randall et al. | 29/568 |
| 3,744,128 | 7/1973 | Schalles | 29/568 |
| 3,821,844 | 7/1974 | Harman et al. | 29/568 |
| 4,065,988 | 1/1978 | Zohneis et al. | 29/568 X |
| 4,196,506 | 4/1980 | Reed | 29/568 |
| 4,302,144 | 11/1981 | Hallquist | 29/568 X |

FOREIGN PATENT DOCUMENTS

| | | | |
|---|---|---|---|
| 2031219 | 1/1971 | Fed. Rep. of Germany | 29/568 |
| 1602810 | 4/1980 | Fed. Rep. of Germany | 29/568 |

OTHER PUBLICATIONS

"Machining Center Does Turning" American Machinist, Mar. 24, 1969, pp. 118 & 119.
Jones & Lamson Machine Tool Catalog, pp. 22 & 23.

*Primary Examiner*—William R. Briggs
*Attorney, Agent, or Firm*—Quarles & Brady

[57] ABSTRACT

A machine tool operative as both a chucking type lathe and as a horizontal spindle machine center comprises a rotatable spindle horizontally journaled to a spindlehead vertically reciprocal on a machine tool upright, the upright being slidably mounted for movement on one leg of an "L" shaped bed. A saddle, mounted for movement along the other leg of the bed, carries a table rotatably journaled therein. Affixed to the table is a tailstock which carries both toolholders and workpiece holders. A changer arm, journaled to the spindle for rotation about, and linear movement along, an axis parallel to the axis of spindle rotation is operative, when the upright is moved along the bed to a first changer position, to transfer toolholders and workpiece holders between the spindle and a storage drum journaled to the bed for rotation about an axis parallel to the axis of spindle rotation. The changer arm is also operative, when the upright is moved to a second change position distal from the storage drum and when the saddle is moved and table is rotated, to position the tailstock along the side of the spindle, to transfer toolholders and workpiece holders between the spindle and the tailstock. In this way, a turning operation can be accomplished by transferring a turning tool to the tailstock and a workpiece holder to the spindle. A machining center operation is effectuated by transferring a workpiece holder from the spindle to the tailstock and by transferring a cutting tool from the storage drum to the spindle.

9 Claims, 13 Drawing Figures

MACHINE TOOL OPERABLE AS BOTH A CHUCKING TYPE LATHE AND AS A MACHINING CENTER

BACKGROUND OF THE INVENTION

This invention relates generally to metal cutting machine tools and more specifically to a metal cutting machine tool which performs both turning and machining center operations on an unfinished workpiece.

In many industrial applications, it is desirable to perform both a turning operation as well as one or more machining center operations, such as drilling, milling, tapping, or reaming, etc. on an unfinished workpiece. Until quite recently, accomplishing both turning operations and machining center operations on a single workpiece required separate machines for each type of operation. In addition to the expense of maintaining separate machines for performing turning and machining center operations, a transport system must be provided for transferring parts from one type of machine to another. During part transfer, the machines are idled, resulting in machine inefficiency.

Recently, machine tools, such as the Kearney & Trecker Model "Milwaukee Matic Turn 12" machining center as described in the Mar. 24, 1969 edition of *American Machinist*, have been developed to perform both machining center and turning operations on a workpiece. To accomplish both turning and machining center operations, the Kearney & Trecker "Milwaukee Matic Turn 12" machining center includes a headstock driven by a hydraulic motor and a rotatable spindle positioned opposite the spindle and driven by an electric drive. An automatic tool changer is mounted adjacent to the spindle and holds both turning tools and cutting tools for effectuating turning and cutting operations, respectively. Although the machining center described above is well suited for performing both turning and machining center operations, the above-described prior art machining center requires separate drives for the spindle and headstock, thereby increasing machine complexity and machine cost.

In contrast, the present invention concerns a machining center for performing both turning and machining center operations having but a single spindle drive system thereby reducing machine complexity and cost.

It is an object of the present invention to provide a machine tool having but a single spindle drive system for performing both turning and machining operations on a workpiece.

It is another object of the present invention to provide a single spindle machine tool, operable as both a chucking type lathe and as a machining center, having a storage drum thereon for holding both toolholders and workpiece holders.

BRIEF DESCRIPTION OF THE INVENTION

Briefly, in accordance with the preferred embodiment of the invention, a machine tool operative as both a chucking type lathe and as a horizontal spindle machining center comprises a bed on which an upright is slidably mounted for movement on the bed along a first axis. A spindlehead is slidably mounted on the upright for vertical movement thereon along a second axis perpendicular to the first axis. The spindlehead has a spindle journaled in the spindlehead parallel to the first axis for receiving workpiece holders or toolholders. The spindle is rotatably driven by a motor fastened to the spindlehead and coupled to the spindle to rotate the workpiece or toolholder. Tool and workpiece holding means, taking the form of a saddle slidably mounted on the bed for movement thereon along a third axis perpendicular to the first and second axis, a table journaled to the saddle for rotation about an axis parallel to the second axis and a tool workpiece holding tailstock fixedly mounted to the table, are provided for positioning a toolholder or a workpiece holder opposite to, perpendicular with, or along side of the spindle. The toolholders and workpiece holders received by the spindle and by the tailstock are stored in a storage means which takes the form of a storage drum rotatably journaled to an arm fastened to the bed. Means in the form of a motor attached to the arm and a feedback transducer attached to the motor are provided to rotate the storage drum to position a selected workpiece holder or toolholder in a ready position in alignment with the spindle. A changer arm journaled to the spindlehead for rotation about, and transverse movement along an axis parallel to the axis of spindle rotation is provided to transfer a workpiece holder or a toolholder between the spindle and the storage drum and to transfer a workpiece holder and a toolholder between the spindle and the tailstock when the tailstock is in parallel alignment with the spindle. By first transferring a turning tool from the storage drum to the spindle and then from the spindle to the tailstock and then by transferring a workpiece from the storage drum to the spindle, a turning operation on the workpiece can be performed. Machining center operations such as milling, drilling, or tapping, can be performed on the same workpiece by first exchanging the workpiece held in the spindle with the turning tool held in the tailstock and then by exchanging the appropriate cutting tool held in the storage drum with the turning tool held in the spindle.

BRIEF DESCRIPTION OF THE DRAWINGS

The features of this invention believed to be novel are set forth with particularity in the appended claims. The invention itself, however, both as to organization and method of operation together with further objects and advantages thereof, may best be understood by reference to the following description taken in conjunction with the accompanying drawings in which:

DETAILED DESCRIPTION OF THE PREFERRED EMBODIMENT

Figure 1:
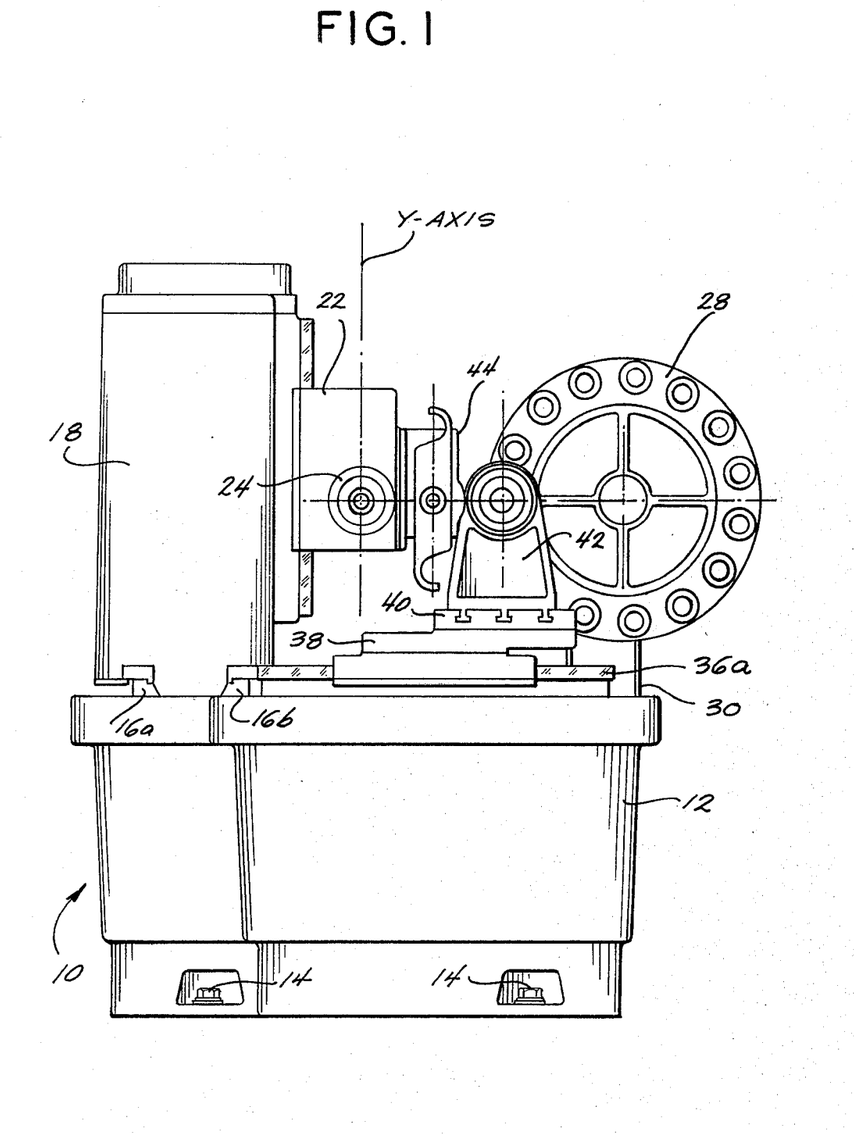
FIG. 1 is a front elevational view of the machining center of the present invention.
Figure 2:
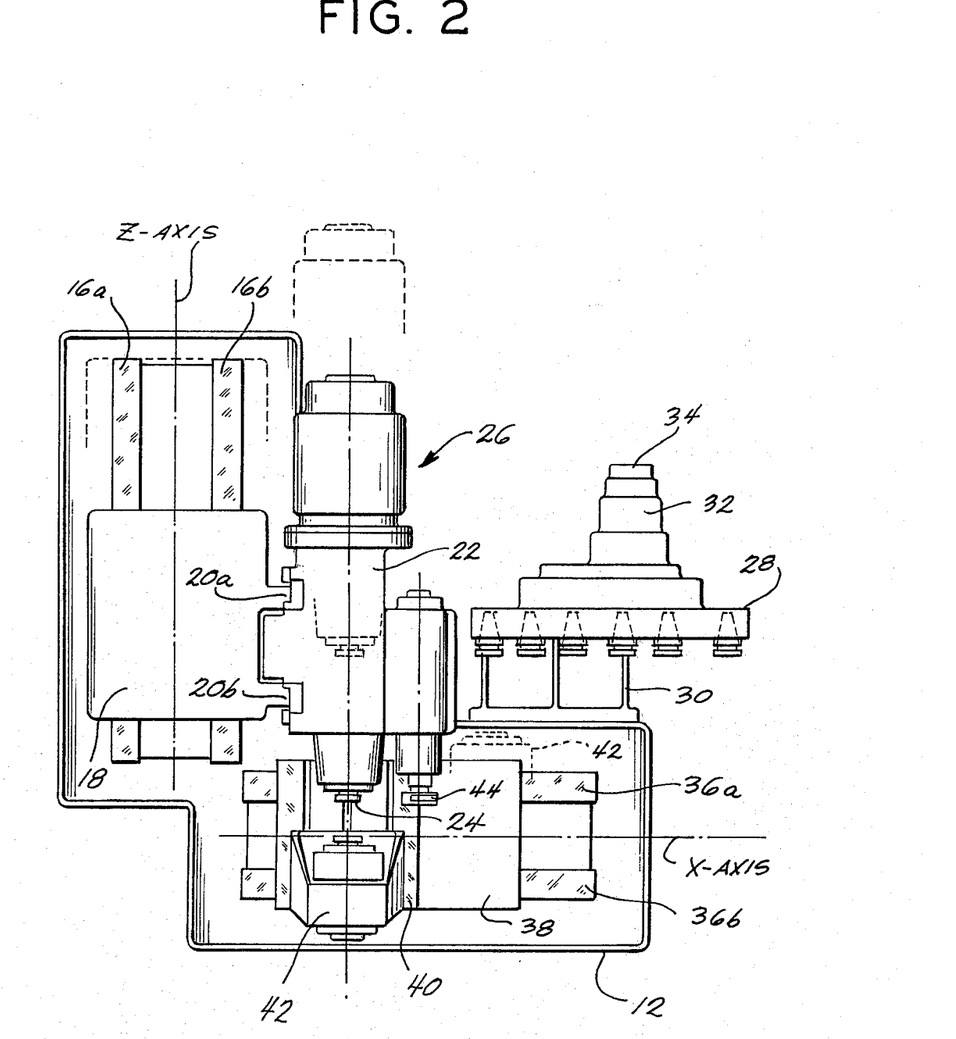
FIG. 2 is a plan view of the machining center illustrated in FIG. 1.
Figure 3:
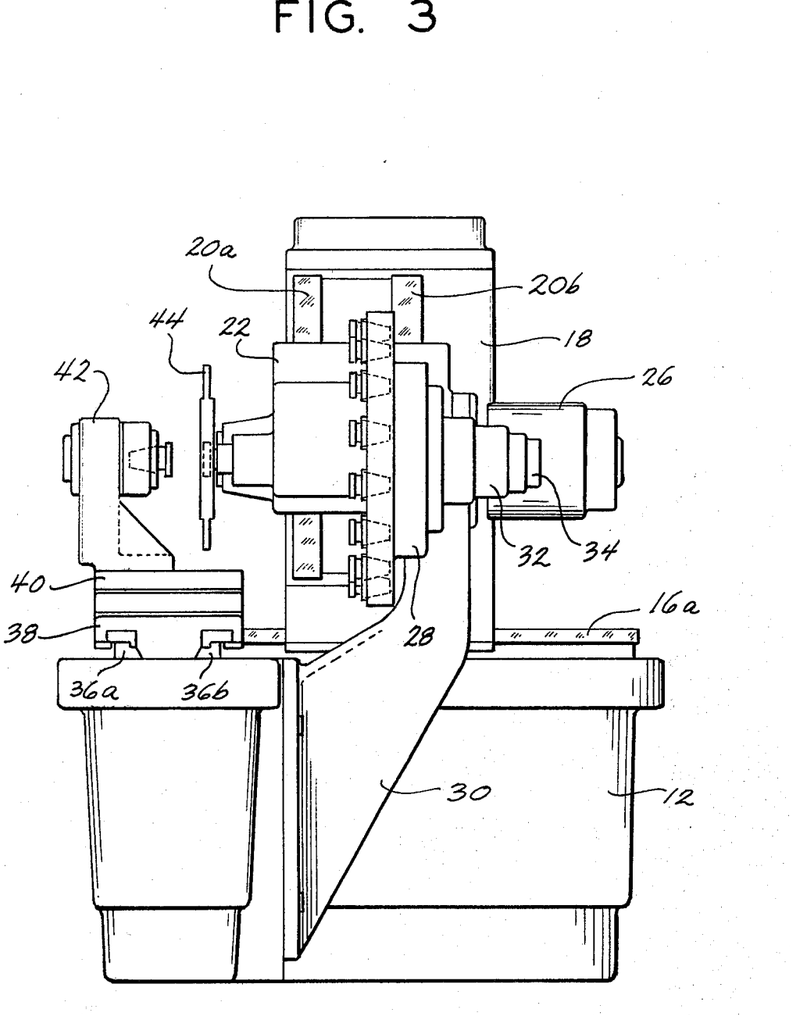
FIG. 3 is a right side elevational view of the machining center illustrated in FIG. 1.

FIGS. 1 to 3 illustrate the front, plan (top) and right side views, respectively, of an improved machining center 10 in accordance with the present invention which is operable both as a chucking type lathe and as a horizontal spindle machining center capable of performing machining center operations such as drilling, milling, tapping and reaming, to name a few, on a workpiece. Machining center 10 comprises an "L" shaped base or bed 12 (best illustrated in FIG. 2) which is mounted to the floor by leveling bolts 14 (illustrated in FIG. 1). A first pair of horizontal ways 16a and 16b (best illustrated in FIGS. 1 and 2) are mounted to bed 12 in spaced apart relationship so as to be parallel to a first axis, designated the "Z" axis which extends along one leg of the bed. A vertically extending upright 18 is slidably mounted by bearings (not shown) on ways 16a and 16b and is propelled therealong by conventional means (not shown) such as an air cylinder or a ball screw and a ball nut arrangement.

Upright 18 carries a pair of vertical ways 20a and 20b (illustrated in FIGS. 2 and 3) mounted on an outward facing side of upright 18 in spaced apart relationship so as to extend vertically parallel to a second or "Y" axis which is perpendicular to the "Z" axis. A spindlehead 22 is slidably mounted by bearings (not shown) on ways 20a and 20b for movement on the upright along the "Y" axis. Conventional means (not shown) preferably in the form of a ball screw and a ball nut, are provided to move spindlehead 22 along ways 20a and 20b. Journaled in spindlehead 22 for rotation about an axis parallel to the "Z" axis of a spindle 24 which receives either a workpiece holder or a toolholder. Spindle 24 is rotatably driven by a spindle motor 26 affixed to spindlehead 22 and connected to spindle 24 by a suitable gearing arrangement (not shown).

The toolholders and workpiece holders received by spindle 24 are stored in a storage drum 28 which is rotatably journaled in arm 30 affixed to bed 12. Tool storage arm 28 is rotatably driven about an axis parallel to the axis of spindle rotation by a motor 32 attached to arm 30 (illustrated in FIGS. 2 and 3). A feedback transducer 34, preferably taking the form of a resolver, is attached to motor 32 and provides an electrical output signal in accordance with motor 32 rotation. The output signal of resolver 34 is supplied to a machine tool control system (not shown), such as are well known in the art, which servo-controls motor 32 in accordance with the feedback signal from resolver 34 to insure accurate angular orientation of storage drum 28.

A second set of horizontal ways 36a and 36b (best illustrated in FIGS. 2 and 3) are mounted on bed 12 in spaced apart relationship along the other leg thereof so as to extend parallel to a third axis, designated the "X" axis which lies in the same plane as the "Z" axis but is perpendicular thereto. Ways 36a and 36b carry a saddle 38 slidably mounted thereon for movement along the "X" axis. Conventional means (not shown) such as a ball nut and ball screw or an air cylinder are provided to move saddle 38 along the "X" axis. A table 40, having a tailstock 42 mounted thereon, is journaled in saddle 38 for rotation about an axis parallel to the "Y" axis. Tailstock 42 has a self indexing chuck therein for receiving either a workpiece holder or a toolholder. By rotating table 40 to one of four index positions, each 90° apart, tailstock 42 can be positioned opposite to, along side of, or perpendicular with spindle 24.

To effectuate transfer of a workpiece holder or a toolholder between storage drum 28 and spindle 24 and between spindle 24 and tailstock 42, a changer arm 44 is journaled to spindlehead 22 for rotation about, and linear movement along, an axis parallel to the axis of spindle rotation. As will become better understood by reference to the below described sequence of machine tool operations, exchange of a workpiece holder or toolholder held in spindle 24 with a workpiece holder or toolholder held in storage drum 28 is initiated by moving upright 18 along the "Z" axis to a first change position distal from table 40 so that spindle 24 is aligned with tool storage drum 28. Then, changer arm 44 is actuated to transfer the workpiece or toolholder held in the spindle with the workpiece or toolholder of storage drum 28 located in a ready position adjacent to the spindle. By moving the upright along the "Z" axis to a second change position distal from the first change position and by moving saddle 38 and rotating table 40 to position tailstock 42 along side of spindle 24, changer arm 44 can thus effectuate an exchange between the workpiece holder or toolholder held in the spindle with the workpiece holder or toolholder held in the tailstock.

Figure 4A:
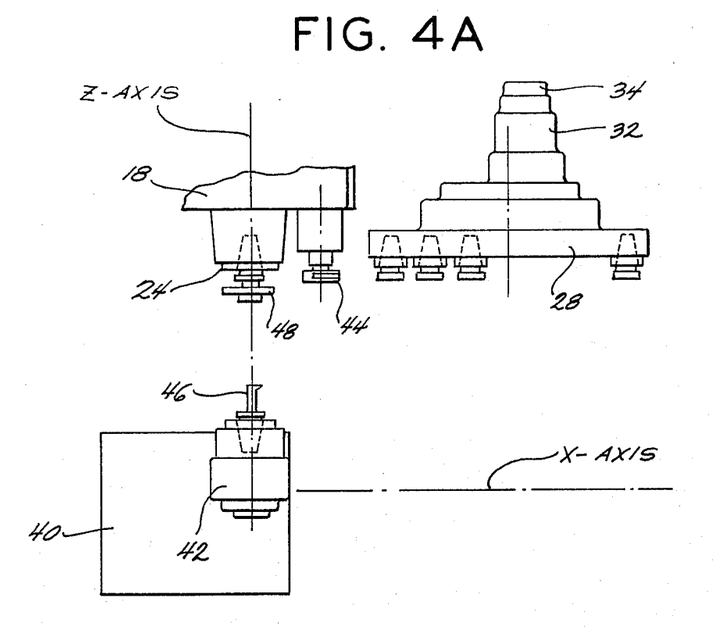
FIGS. 4a to 4j illustrate in sequential fashion the steps executed during an entire machining cycle performed by the machining center illustrated in FIG. 1.
Figure 4B:
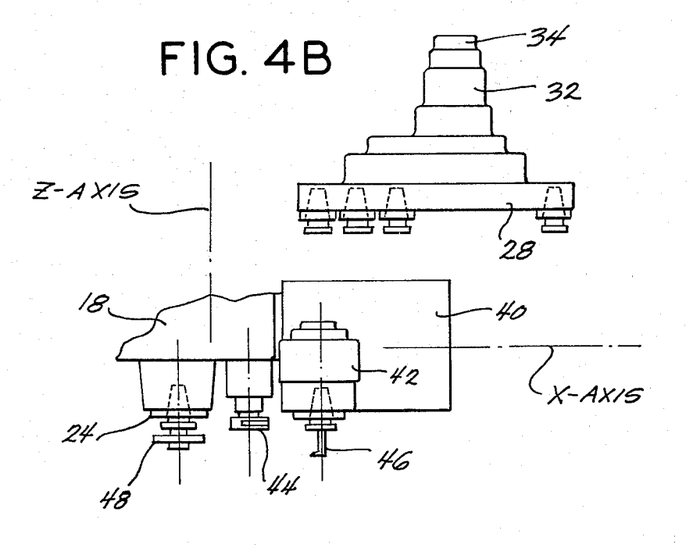
Figure 4C:
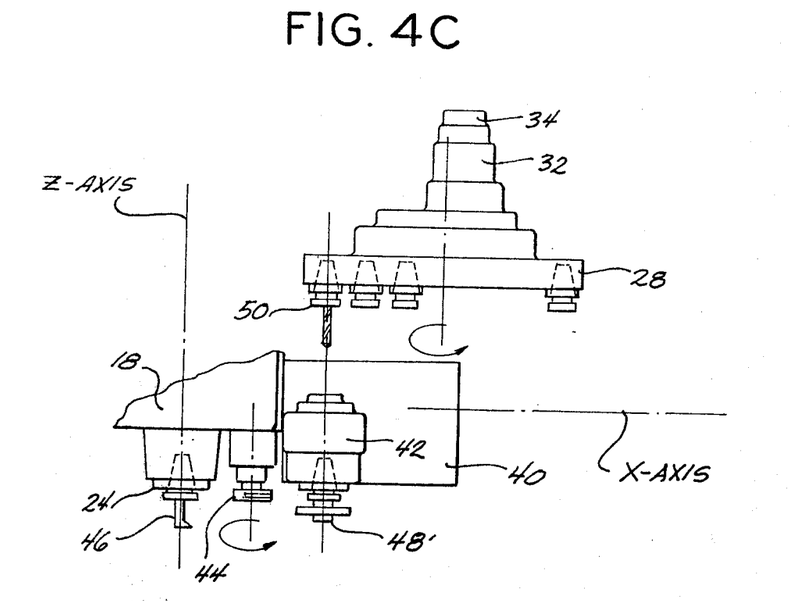
Figure 4D:
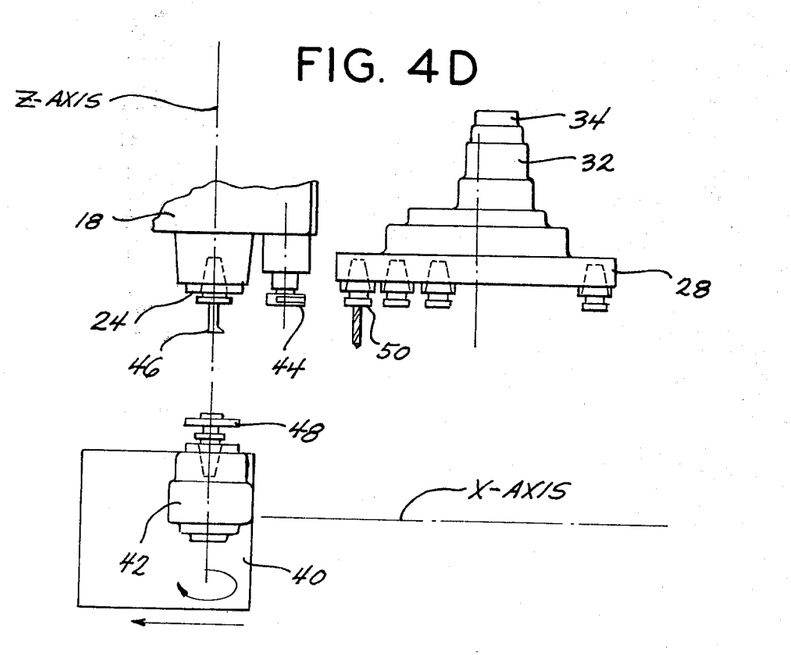
Figure 4E:
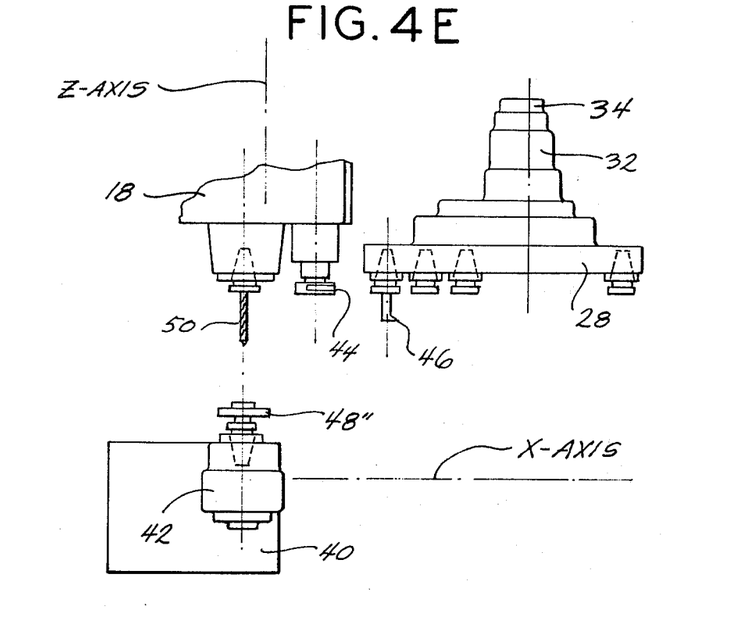

The steps comprising a typical machining cycle during which a turning and drilling operation are performed will now be described sequentially with respect to FIGS. 4a to 4j. At the outset of the machining cycle, as illustrated in FIG. 4a, it will be assumed that a turning toolholder 46 is held in tailstock 42 and that an unfinished workpiece 48 is held in spindle 24. When the turning operation is completed, a machining center operation, such as drilling, for example, is initiated by first moving upright 18 along the "Z" axis as illustrated in FIG. 4b from the first change position adjacent to the second change position. Simultaneously, the saddle (not shown) is moved and table 40 is rotated so as to align tailstock 42 along the side of spindle 24. Thereafter, as illustrated in FIG. 4c, changer arm 44 is actuated to transfer turning toolholder 46 from tailstock 42 to spindle 24 and to transfer the partially finished workpiece 48' from the spindle to the tailstock. At the same time, storage drum 28 is rotated to position a drill holder 50 in the ready position. Next, as illustrated in FIG. 4d, the saddle (not shown) is caused to be moved along the "X" axis and table 40 is rotated 90° to position tailstock 42 opposite spindle 24. While table 40 is being rotated, upright 18 is caused to be moved along the "X" axis to the first change position adjacent with storage drum 28. Following rotation of table 40 and movement of upright 18, changer arm 44 is actuated as illustrated in FIG. 4e to transfer drill holder 50 to spindle 24 from storage drum 28 and to return the turning tool 46 to storage drum 28. Once drill holder 50 is transferred to spindle 24, then the necessary drilling operations can be completed on the workpiece then held in tailstock 42.

Figure 4F:
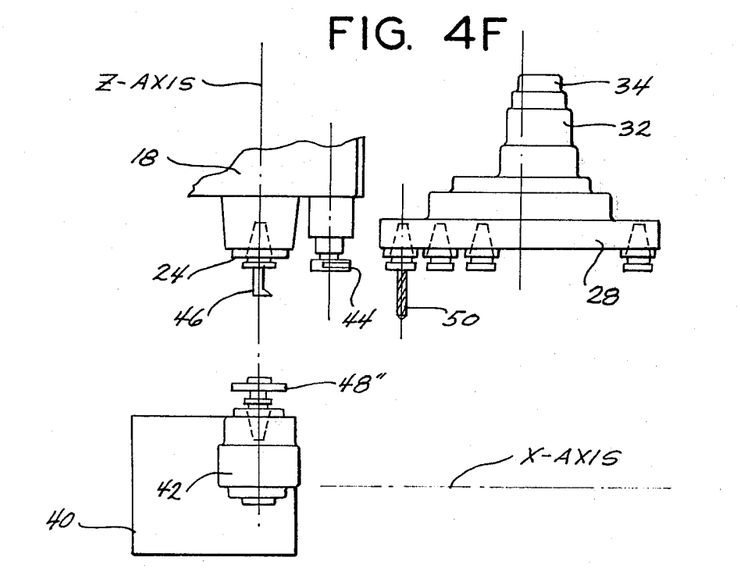
Figure 4G:
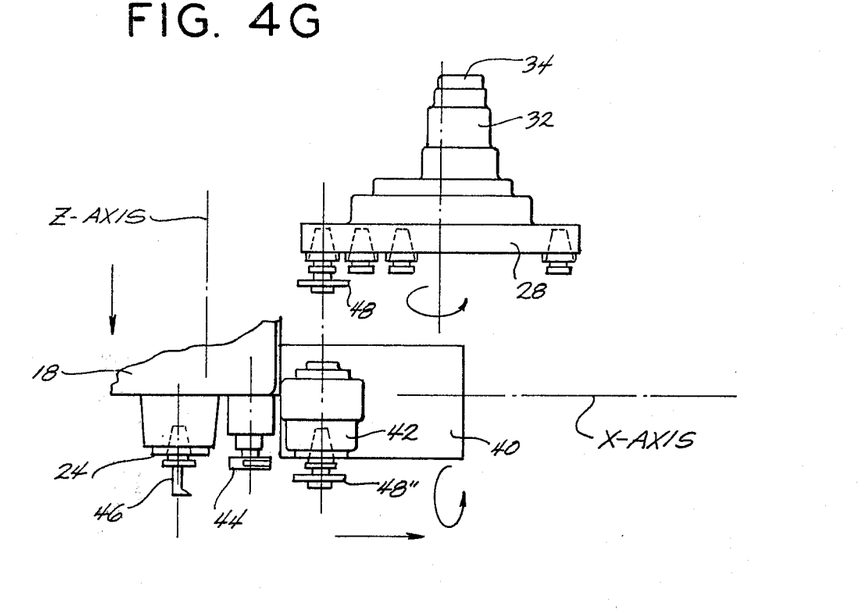
Figure 4H:
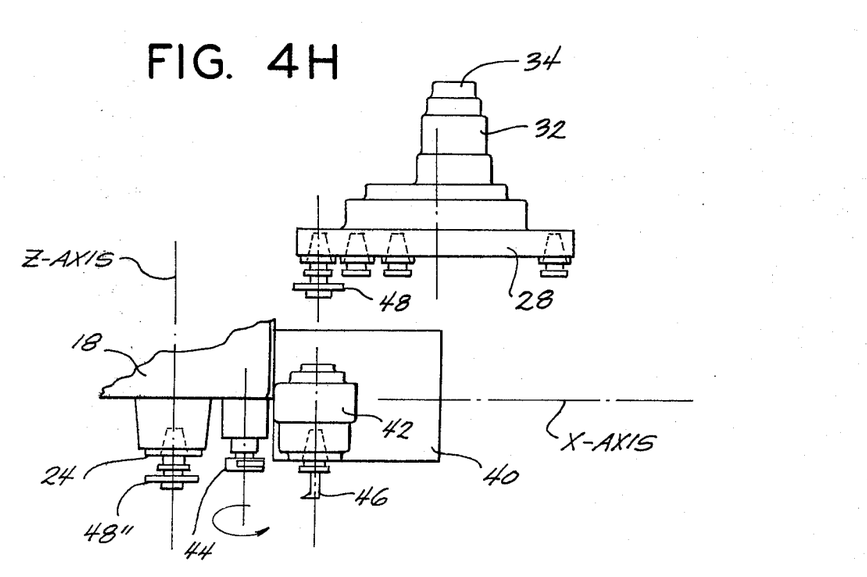
Figure 4I:
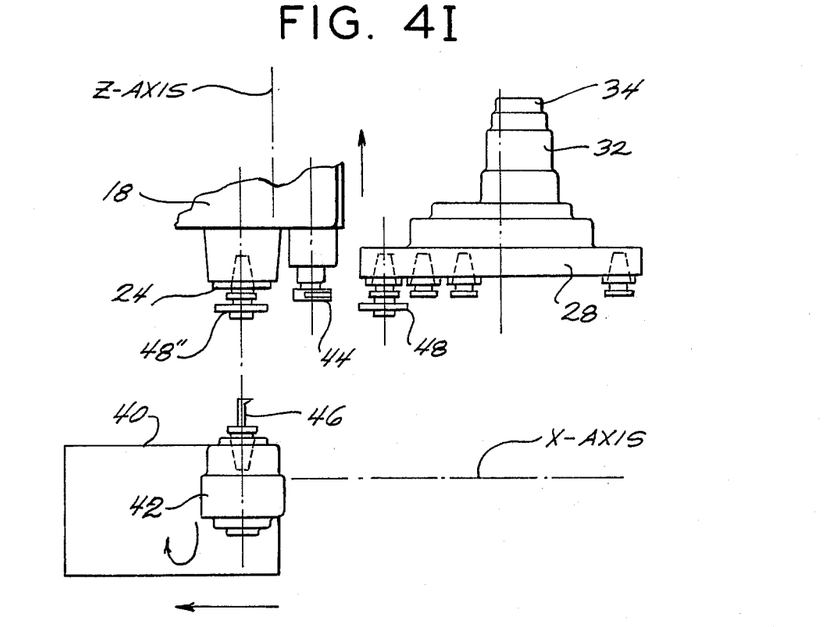
Figure 4J:
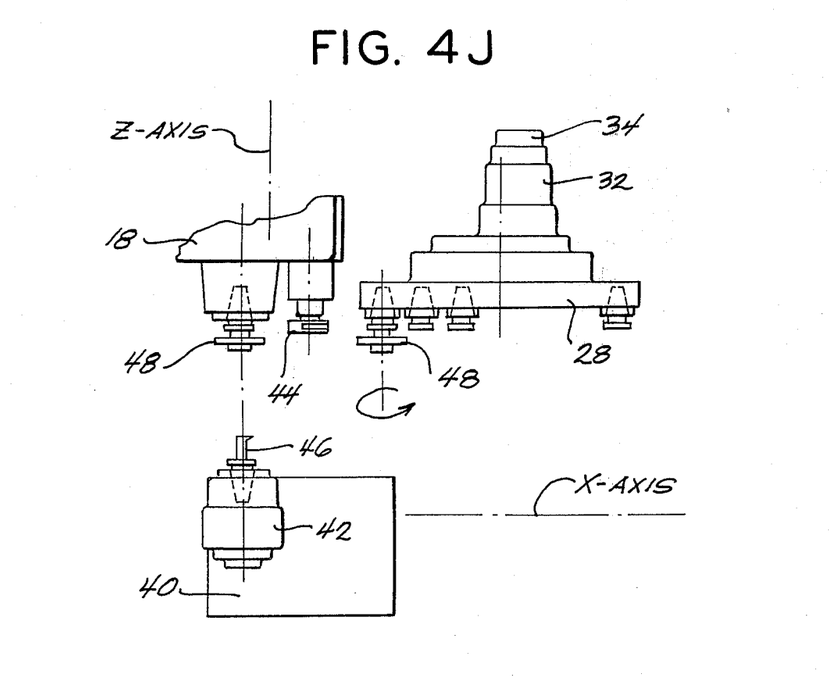

After the drilling operation is completed, leaving a finished workpiece holder 48' in the spindle, a turning operation on a new workpiece is initiated by first actuating changer arm 44 to return drill holder 50 to storage drum 28 and to transfer turning toolholder 46 from the storage drum to spindle 24 as illustrated in FIG. 4f. Thereafter, as illustrated in FIG. 4g, upright 18 is moved along the "Z" axis to the second change position distal from storage drum 28 while the saddle is moved and table 40 is rotated to align tailstock 42 alongside of spindle 24. At the same time, tool storage drum 28 is caused to be rotated to place a new workpiece 48 in the ready position. Next, as illustrated in FIG. 4h, changer arm 44 is actuated to transfer turning toolholder 46 from spindle 24 to tailstock 42 and to transfer finished workpiece holder 48' held in tailstock 42 to spindle 24. Thereafter, as illustrated in FIG. 4i, the saddle is moved and table 40 is rotated to position tailstock 42 opposite to spindle 18 while upright 18 is moved along the "Z" axis away from the tailstock to the first change position adjacent to storage drum 28 so as to align spindle 24 therewith. Once spindle 24 is aligned with storage drum 28 as illustrated in FIG. 4j, changer arm 44 is actuated, transferring finished workpiece holder 48' from spindle 24 to storage drum 28 and transferring unfinished workpiece holder 48 from the storage drum to the spindle, thereby permitting a turning operation to be performed on unfinished workpiece holder 48 now in spindle 24. By comparing FIGS. 4a with 4j, it can be seen that the condition depicted in FIGS. 4a and 4j are identical, thus indicating completion of the machining cycle. It should be noted, however, that the above-described machining cycle is only exemplary of a typical machining cycle. To perform different types of machining operations on an unfinished workpiece, such as milling, reaming, or tapping, it would obviously be necessary to transfer the appropriate toolholder from storage drum 28 to spindle 24 at the outset of each operation.

The foregoing describes a single horizontal spindle machine tool which is operable as both a chucking type lathe and as a machining center having a storage drum for storing both workpiece holders and toolholders.

Although the illustrative embodiment of the invention has been described in considerable detail for the purpose of fully disclosing a practical operative structure incorporating the invention, it is to be understood that the particular apparatus shown and described is intended to be illustrative only and that various novel features of the invention may be incorporated in other structural forms without departing from the spirit and scope of the invention as defined in the subjoined claims.

The principles of this invention having now been explained in connection with the foregoing, I hereby claim as my invention:

1. An improved machine tool operative as both a chucking type lathe and a horizontal spindle machining center comprising:
   a frame;
   a spindlehead; means slidably mounting said spindlehead on said frame for vertical and horizontal movement thereon;
   a tool and workpiece carrying spindle rotatably journaled in said spindlehead parallel to the path of horizontal movement of said spindlehead, said spindle having means to receive a workpiece or a cutting tool thereon;
   means connected to said spindle for rotatably driving said spindle to rotate the workpiece holder or toolholder in said spindle;
   tool and workpiece holding means slidably mounted on said frame for horizontal movement on said frame perpendicular to the path of horizontal movement of said spindlehead on said frame, said tool and workpiece holding means being rotatable about an axis parallel to the vertical path of spindlehead movement for positioning a workpiece or a tool held therein in a predetermined relationship with said spindle;
   storage means mounted to said bed for storing workpiece holders and toolholders, means connected for rotating said storage means about an axis parallel to the axis of spindle rotation for positioning a workpiece holder or toolholder in a ready position adjacent to said spindle; and
   a changer arm journaled to said spindlehead for rotational movement about, and longitudinal movement along, an axis parallel to said spindle axis for transferring workpieces and tools between said spindle and said storage means and for transferring workpieces and tools between said spindle and said tool and workpiece holding means.

2. The invention according to claim 1 wherein said frame comprises:
   a bed on which said tool and workpiece holding means is slidably mounted for horizontal movement on said bed; and
   an upright on which said spindlehead is slidably mounted for vertical movement, said upright being slidably mounted on said bed for horizontal movement on said bed perpendicular to the path of horizontal movement of said tool and workpiece holding means.

3. The invention according to claim 1 wherein said means for rotatably driving said spindle comrpises a motor fastened to said spindlehead and coupled to said motor.

4. The invention according to claim 3 wherein said tool and workpiece holding means comprises:
   a saddle slidably mounted on said frame for horizontal movement on said frame perpendicular to the path of horizontal movement of said spindlehead;
   a table journaled in said saddle for rotation about an axis parallel to the vertical path of spindlehead movement; and
   a tailstock fixedly mounted to said table for holding workpiece holders and toolholders.

5. The invention according to claim 1 wherein said storage means comprises:
   an arm fastened to said frame so as to extend therefrom parallel to said spindle;
   a storage drum for holding tools and workpieces, said storage drum journaled in said arm for rotation about an axis parallel to said axis of spindle rotation; and
   means fastened to said arm and coupled to said storage drum for rotatably driving said storage drum.

6. The invention according to claim 5 wherein said means for rotatably driving said storage drum comprises:
   a motor fastened to said arm and coupled to said storage drum; and
   feedback transducer means coupled to said motor for producing a feedback signal in accordance with motor rotation which is suitable for controlling motor rotation to assure accurate positioning of said storage drum.

7. A machining center capable of performing turning operations as well as milling and drilling operations;
   a frame;
   a spindle supported by said frame, means for rotating said spindle in a work operation;
   a tool and work storage magazine carrying both workpieces and the tools for operating on said workpieces;
   a tailstock supported by said frame;
   means in said spindle for supporting either a workpiece or a tool for rotation with said spindle;
   supporting means in said tailstock for fixedly supporting either a workpiece or a tool;
   means for positioning said tailstock for cooperation with said spindle; and
   a transfer mechanism operable to transfer tools and workpieces between said storage magazine, said spindle and said tailstock.

8. A machining center according to claim 7 including adapters, means on each of said adapters for securing either a tool or a workpiece thereto;

means on each of said adapters for cooperation with said storage magazine for releasably retaining the adpaters in said storage magazine; and means on each of said adapters for cooperation with said transfer mechanism for securement to said transfer mechanism during the transfer operation.

9. A machining center according to claim 7 wherein said transfer mechanism comprises a transfer arm supported for bodily movement with said spindle; means for moving said transfer arm relative to said spindle for completing the transfer operation; and means for moving said spindle and its associated transfer arm in a position to enable said transfer arm to transfer tools and workpieces between said storage magazine and said spindle, and in a second position to enable said transfer arm to transfer tools and workpieces between said spindle and said tailstock.

* * * * *